United States Patent [19]
Lilley

[11] Patent Number: 4,774,576
[45] Date of Patent: Sep. 27, 1988

[54] METHOD AND APPARATUS FOR SELECTIVELY UNBLANKING SPECIAL SIGNALS INSERTED IN THE VERTICAL BLANKING INTERVAL OF A TELEVISION SIGNAL

[75] Inventor: Martin A. Lilley, Fremont, Calif.

[73] Assignee: Ampex Corporation, Redwood City, Calif.

[21] Appl. No.: 829,588

[22] Filed: Feb. 13, 1986

Related U.S. Application Data

[63] Continuation-in-part of Ser. No. 788,900, Oct. 17, 1985, abandoned.

[51] Int. Cl.[4] .............................................. H04N 7/04
[52] U.S. Cl. ..................................... 358/141; 358/150
[58] Field of Search ............... 358/141, 142, 147, 148, 358/149, 86, 146, 337, 319, 320, 33, 165, 185, 150

[56] References Cited

U.S. PATENT DOCUMENTS

| | | | |
|---|---|---|---|
| 3,493,674 | 2/1970 | Houghton | 358/147 |
| 3,989,891 | 11/1976 | Freestone | 178/7.5 R |
| 4,120,000 | 10/1978 | Ninomiya | 358/148 |
| 4,198,651 | 4/1980 | Barton et al. | 358/21 V |
| 4,230,990 | 10/1980 | Lert, Jr. et al. | 358/142 |
| 4,268,851 | 5/1981 | Heller et al. | 358/10 |
| 4,316,219 | 2/1982 | Smith et al. | 358/150 |
| 4,322,749 | 3/1982 | Weston | 358/139 |
| 4,679,080 | 7/1987 | Bashford et al. | 358/148 |

FOREIGN PATENT DOCUMENTS 2411327 9/1975 Fed. Rep. of Germany ...... 358/150

OTHER PUBLICATIONS

"The Development of the Ampex AST System", by Mark Sanders, Video Systems, Apr. 1980, pp. 46-53.
"Development and Design of the Ampex Auto Scan Tracking (AST) System", by Richard A. Hathaway, et al., SPMTE Journal, vol. 89, Dec. 1980, pp. 931-934.
van der Piepen et al., "Television Line Selection by Programmable Counter" Electronic Engineering, vol. 47, #568, p. 27.

*Primary Examiner*—James J. Groody
*Assistant Examiner*—David E. Harvey
*Attorney, Agent, or Firm*—Robert E. Krebs; Richard P. Lange

[57] ABSTRACT

A method and apparatus for producing a video composite blanking signal which provides for selectively unblanking lines of video information which would normally be blanked according to a predetermined television standard. Each line in a frame of video data is assigned a line type based on its location in the sequence of lines of video information. Those lines that are in the vertical blanking period are assigned a different line type than those which are not. In response to unblanking selection data, line types of lines which are normally blanked are selectively modified to the line types of those lines which are not normally modified. The vertical interval blanking signal is produced only for those line types for line in the vertical blanking period.

45 Claims, 5 Drawing Sheets

FIG_2

FIG_3

FIG_4A

FIG.4B

METHOD AND APPARATUS FOR SELECTIVELY UNBLANKING SPECIAL SIGNALS INSERTED IN THE VERTICAL BLANKING INTERVAL OF A TELEVISION SIGNAL

CROSS REFERENCE TO RELATED APPLICATIONS

This application is a continuation-in-part of U.S. application Ser. No. 788,900, filed Oct. 17, 1985, now abandoned, copending herewith.

BACKGROUND OF INVENTION

This invention relates generally to video time-base correctors of the ype having an internal sync generator for generating a composite blanking signal according to television standards which specify which lines in a video signal are normally blanked and which lines are normally not. This invention further relates to selectively unblanking normally blanked lines in the vertical blanking interval of a video signal, such that specially inserted data on these lines may be retrieved.

A broadcast television signal is composed of video data and reference synchronizing signals. The video data represents what a viewer perceives as the video picture, while the reference synchronizing signals are used by the television receiver to organize the video data to properly form the television picture. A moving video picture as seen by the viewer is actually a series of still pictures called video frames. A frame is a single snapshot of the moving video picture. The video data in the video frame is organized as a number of horizontal lines.

In a television picture tube, an electron beam selectively scans each line of video data horizontally across the face of the picture tube. One complete picture, or frame of video is actually composed of two interlaced scans down the screen. Starting at the top of the screen, a line of video data is scanned and then the second line below it is scanned, skipping a line. This means that when a field is scanned across a picture tube, only every other line is actually scanned. For example on the first field, line 1 would be scanned and then line 3, then line 5, and so on. For the second field, line 2 would be scanned and then line 4, and so on.

Thus each video frame consists of typically two fields of video data which are interlaced to reduce flicker. During the field sync period and for several lines thereafter the video data is normally blanked before commencement of the active picture period. The period between the end of active video on one field and the beginning of active video on the next field is known as the field blanking period. During this time, in the picture generating apparatus, such as a camera, and likewise the receiver, vertical retrace occurs. The lines in the vertical blanking period following the post-equalizing pulses may be used to carry additional video data, not necessarily related to the active video. Such video data might include vertical interval test signals (VITS), vertical interval time code (VITC), teletext data, or closed caption data for the hearing impaired. It is desirable that any additional video data added to the composite video signal during the vertical blanking period can be selectively blanked or unblanked on a line-by-line basis as well as a field-by-field basis, since the two vertical blanking periods may contain different data.

There are a number of horizontal lines that occur during the vertical blanking interval which, by definition are normally blanked. It is these horizontal lines which occur during the vertical blanking period that are the subject of this disclosure. The composite blanking signal is a combination of the horizontal and vertical blanking signals.

In the broadcast environment, video signals may be received from many sources and some of the signals may have additional information encoded in the lines of video data of the vertical blanking period as described above. It is desirable for the operator to be able to selectively decide which of the lines containing special data signals during the vertical blanking period ot unblank so that they may be passed on. For example, if the first three lines of the vertical blanking period after the post equalization pulses of each field of a video frame contain VITS, which is used only in the studio and thus not transmitted to viewers, and the video lines 18 and 280 (for M/NTSC) of fields 1 and 2 respectively, contain closed captioned information, which must be transmitted with the broadcast signal, and the signal is to be sent to the broadcasting tower, the video engineer would like to be able to leave the VITS lines normally blanked, but would also like to unblank the closed captioned lines so that they will be sent to the home decoder of the hearing impaired.

Another desirable feature would be the ability to remotely control the unblanking operation. For example, while reproducing a signal from a video tape recorder it would be desirable for the engineer to be able to turn on or off the unblanking process from the video tape recorder control panel.

The composite blanking signal is created as one of the standard outputs of a reference signal by a reference sync generator. Reference sync generators can be found in video equipment such as video cameras and video time-base correctors and provide blanking signals which form a part of the composite video signal. Unblanking of normally blanked lines of the vertical blanking period can be done by any device that creates new reference signals by means of a reference sync generator. Such unblanking is usually performed as an additional feature of a time-base corrector.

A time-base corrector is a device that receives a video signal from a source such as a video tape recorder and produces an output video signal that has been synchronized to a standard reference signal and has been corrected for a variety of errors. The errors include drop-outs and tape induced timing errors caused by tape stretch. As part of this process, a new set of reference signals, including the composite blanking signal, is created by an internal reference sync generator. Because of this fact, the time-base corrector is an excellent location for the implementation of unblanking operations.

One known method of controlling the unblanking of lines in the vertical blanking period is to vary the vertical blanking duration. This method is imprecise and can only be used to unblank consecutive lines at the end of the vertical blanking period.

Additional problems for an unblanking system are created by the fact that there exist four major television standards used worldwide and the lack of standardization concerning which lines of the vertical blanking period should be used for special information. In an unblanking system the number of lines per frame of video, the position of the vertical blanking period, the number of lines in the blanking period, and the composite blanking signal are all critical in its design. These number change for each standard. The standard used in the United States and Japan is referred to as NTSC, while the standard used in Great Britain is call PAL. There are additional standards such as PAL-M and SECAM. These standards differ in how the video signal is arranged, such as the number of lines per frame (NTSC & PAL-M=525, PAL & SECAM=625). The number of lines in the vertical blanking period also vary from standard to standard, and even within a standard.

As a result of these problems there is a need for a method or apparatus that can provide selective unblanking of any combination of lines during the vertical blanking period. There is also a need for a common method or apparatus that will work with any video standard. Such a method or apparatus desirably also allows for remote control of the unblanking operation.

SUMMARY OF THE INVENTION

The present invention overcomes the limitations of the above discussed method for selectively unblanking lines in the vertical blanking period. The present invention can handle four standards in a single apparatus. Further, the present invention is capable of being remotely controlled.

In accordance with the present invention, a consecutive line count representing each line in a frame of a composite video signal is produced by a line count generator. The line count generator adjusts the number of lines per frame to the selected television standard.

In conjunction with a selected television standard signal, a line type generator assigns a line type to each line in the frame of video data. For each television standard, it assigns a different number for each waveform that describes a line of video. One line type is assigned to lines that do not occur during the vertical blanking period, or normally active picture lines. Another line type is assigned to lines of the vertical blanking period which are normally blanked, following a set of post-equalizing pulses. Other line types numbers are arbitrarily assigned to lines during pre-equalizating period, the vertical sync period, and the post-equalizing period, and to other lines which are different from normally active lines. Only the line type number assigned to lines of active video result in unblanked lines. The assignment of these other lines types is not important to the purposes of this disclosure.

After each line is assigned a line type, the line types are selectively modified by a line type modifier. When the line type modifier receives line types assigned to lines of active video, lines normally not blanked, they are passed through unchanged. When it receives the line type assigned to lines in the vertical blanking period that follow the post equalizing pulses, the line type modifier modifies that line type in accordance with unblanking line selection data. Unblanking line selection data reflects the operator's choices as to which lines are to be unblanked. For lines that are to be blanked, the line type modifier leaves the line type unchanged. For lines that are to unblanked, the line type modifier changes the line type to the line type normally assigned to lines that carry active video.

The sequence of line types is then used to directly form the composite blanking signal. For the line type indicating a line with normally active video, only the horizontal blanking signal is produced. When a line type indicating a line normally blanked, is encountered, each line is completely blanked.

In this fashion a composite blanking signal is produced which reflects the unblanking selections, which can be entered at a control panel located remotely from this apparatus.

Various of the above-mentioned and further features and advantages will be apparent from the specific examples described hereinbelow of an exemplary method and apparatus.

DETAILED DESCRIPTION

The design and construction of time-base correctors are well known to those skilled in the art. A description of two exemplary time-base correctors, the Ampex Corporation TBC-80 and the Ampex Corporation TBC-3 can be found in the publications entitled TBC-3 Digital Time-Base Corrector Service Manual, Catalog No. 1809606-01, Issued: August 1984 and TBC-80 Digital Time-Base Corrector Installation and Operation Manual, Catalog No. 1809591, Issued: April 1982, respectively.

Figure 1:
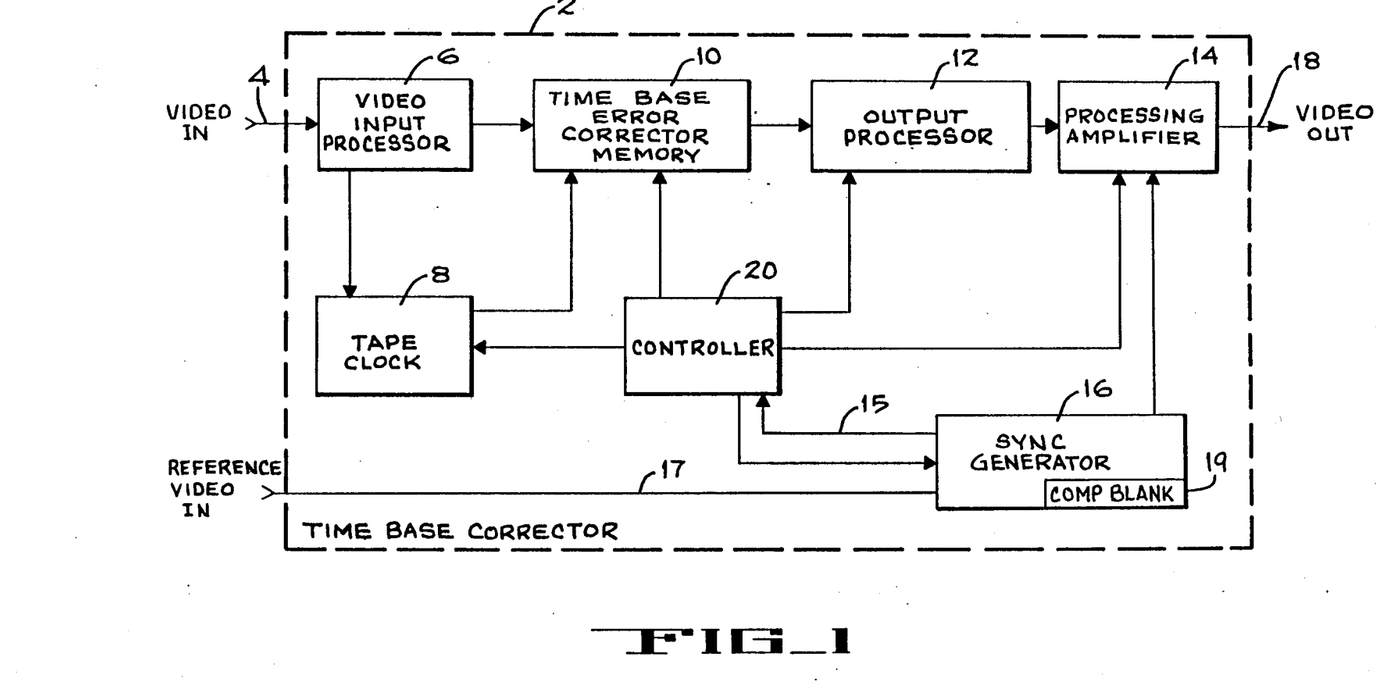
FIG. 1 is a schematic representation of the components of a time-base corrector of the present invention.

Referring now to FIG. 1, the following is a general description of the operation of a time-base corrector. A video signal 4 to be time-base corrected in a time-base corrector 2, enters a video input processor 6. Video input processor 6 separates the video data from the reference data of the video signal 4. The reference data is for the most part discarded, with the exception of basic timing pulses which are passed to a tape clock 8. The separated video data is passed to a time-base error corrector memory 10, which also receives timing information from tape clock 8. The time-base error corrector memory 10 performs error correction on the separated video data and sends the time-base corrected video data to an output processor 12. Output processor 12 prepares the video data to be recombined with new reference sync and blanking signals. A reference sync generator 16, using a reference video in signal 17, the house reference signal, creates a complete set of reference signals to be combined with the video data. This recombination occurs in a processing amplifier 14 which outputs a time-base corrected video signal 18. All of the elements of time-base corrector 2 are controlled by controller 20. Additionally, controller 20 receives a number of timing signals 15 from sync generator 16. Part of reference sync generator 16 is a selective composite blanking signal generator 19.

Figure 2:
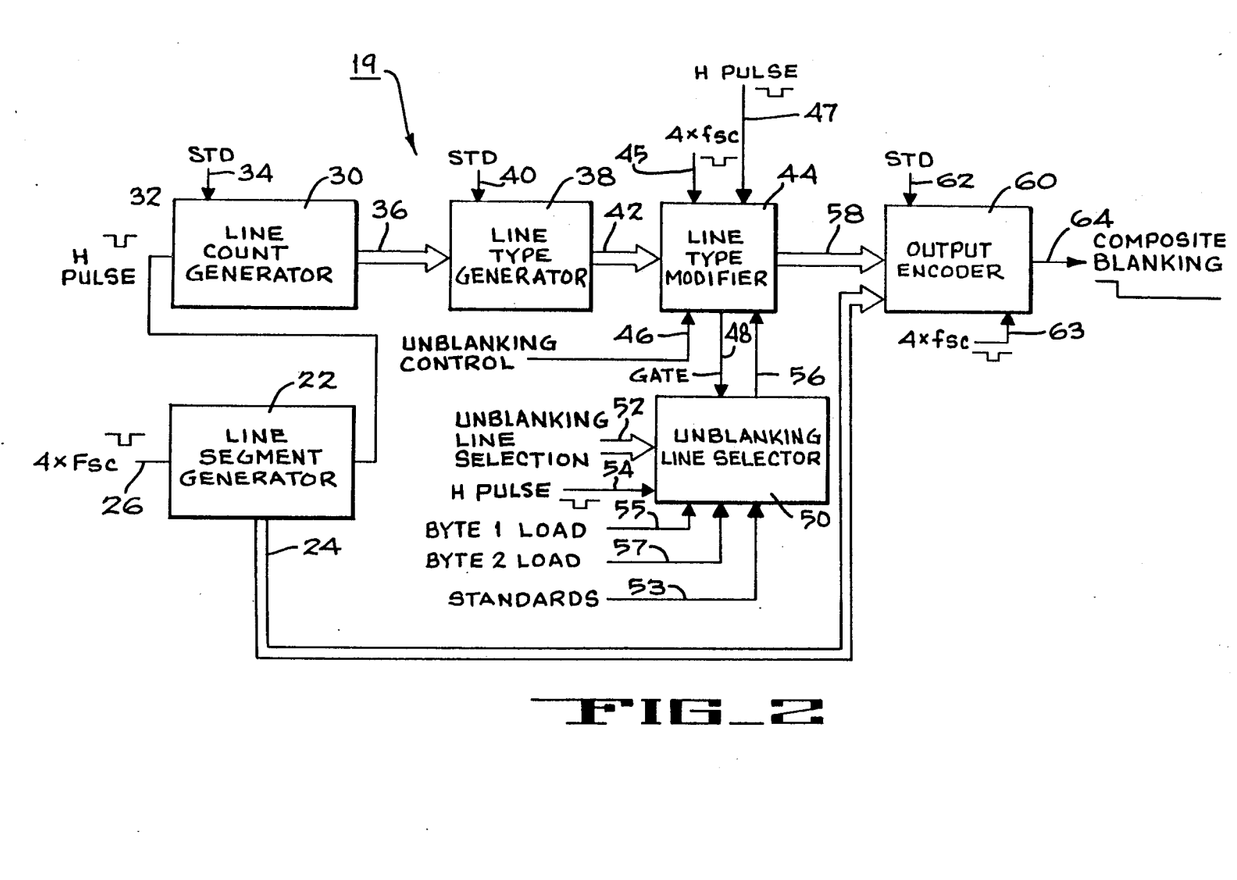
FIG. 2 is a schematic representation of a selective unblanking circuit for use in the time-base corrector of FIG. 1.

Referring now to FIG. 2, which is a schematic representation of the selective composite blanking generator 19, line segment generator 22, creates a horizontal pulse signal 32 clocked by the 4×F sc (four times subcarrier frequency) input signal 26. Line segment generator 22 also creates a 4 bit line transition data 24, which is fed to output encoder 60. A line counter generator 30 creates a sequential line count clocked by a H pulse signal 32.

The lower limit on the line counter is set by a line count television standards signal 34 (labelled STD, as are all the television standard signals in FIG. 2).

The output of line count generator 30, line count 36, is fed in binary form to a line type generator 38. In accordance with a line type standards signal 40, line type generator 38 creates a line type 42 for each line count 36.

The output of line type generator 38 is fed in binary form to a line type modifier 44. The line type modifier 44 also receives an unblanking control signal which controls its operation. Upon detecting certain line types, line type modifier 44 sends a gate signal 48 to an unblanking line selector 50.

The unblanking line selector 50 receives unblanking line selection data 52 as two bytes of eight bits each from controller 20 (FIG. 1) and two byte load signals 55 and 57. In response to gate signal 48, unblanking line selector 50 outputs a modify signal 56 based upon the unblanking line selection data 52 and clocked by H pulse signal 54.

The modify signal 56 from the unblanking line selector 50 is fed to line type modifier 44. In response to modify signal 56, line type modifier 44 selectively modifies line types 42, and outputs modified line types 58 which are reclocked in accordance with a four times the frequency of the subcarrier (4×Fsc) signal 45 and a H pulse used as an enable.

The modified line types 58 are fed as 4 bit data, representing 16 possible line types, to an output encoder 60. Line type transition data 24, from line segment generator 22, is also fed to output encoder 60. In accordance with an output encoder standards signal 62 and the line transition data 24, and clocked by a 4×Fsc signal 63, output encoder 60 generates a composite blanking reference signal 64 which forms one output of reference sync generator 16 of FIG. 1.

Operation of the circuit of FIG. 2, is as follows. Line segment generator 22 takes 4×Fsc signal 26 to produce two signals. The first is the horizontal pulse signal 32 which is used to clock line count generator 30. Line segment generator 22 also produces the 4 bit line transition data 24, which is fed to output encoder 60. Line transition data 24 defines in increments of 4×Fsc all transitions in all horizontal waveforms. As far as the composite blanking is concerned only four transitions across each line are used. These are the leading edge of horizontal blanking, the trailing edge of horizontal blanking, the leading edge of vertical blanking on the first field, and the trailing edge of vertical blanking on the second field. Of these transitions only the first two are used for generation of normal horizontal blanking. The purpose of the output encoder 60 is to decide which lines in the television frame will be unblanked or blanked by combining the line transition data 22 with the line type data 58. Active picture lines are always unblanked but certain other lines in the vertical blanking interval may be unblanked.

The line count generator 30 is simply a counter that counts from 1 to the total number of lines is one frame of video. This number differs in each television standard. These numbers are, however, well known to those skilled in the art and are easily available as part of the published specification for each television standard. In line count generator 30, the number of lines per frame is controlled by the television line standards signal 34. The counter in line count generator 30 is clocked by the H pulse signal which is at the horizontal video scan rate, which is also well known to those skilled in the art. The result from line count generator 30 is a series of sequential binary numbers clocked by the horizontal scan rate. The start of each sequence is normally locked toot reference video in 17, the house reference. Upon completion of a sequence a new sequence is started.

This series of binary numbers is used by the line type generator 38 to create a series of line types. Each television standard specifies which lines are to carry video data and which lines occur during vertical blanking and should be blanked. Again this information is well known to those skilled in the art. These are defined as line types for each television standard.

The actual waveforms for all the reference sync signals for each line of video data for all four of the most used television standards (NTSC, PAL, PAL-M, and SECAM) can be represented as 16 line types. As can be expected there is some overlap between television standards. For the purposes of the present invention it is sufficient to say that there are less than 16 line types needed for each standard to produce the desired unblanking.

Tables 1 through 4 show the line type assignments for each television standard.

TABLE 1

| | 525 Line NTSC Television Standard | | |
|---|---|---|---|
| | Line-type Numbers | | Unblanking |
| Line Number | Assigned | Possible Modify | Gate Signal |
| 001–003 | 01 | 01 | L |
| 004–006 | 03 | 03 | L |
| 007 | 08 | 09 | H |
| 008 | 08 | 09 | H |
| 009–018 | 08 | 09 | H |
| 019–258 | 09 | 09 | L |
| 259 | 09 | 09 | L |
| 260 | 04 | 04 | L |
| 261,262 | 03 | 03 | L |
| 263 | 00 | 00 | L |
| 264,265 | 01 | 01 | L |
| 266 | 02 | 02 | L |
| 267,268 | 03 | 03 | L |
| 269 | 06 | 06 | H |
| 270 | 08 | 09 | H |
| 271–280 | 08 | 09 | H |
| 281 | 10 | 09 | H |
| 282–521 | 09 | 09 | L |
| 522 | 09 | 09 | L |
| 523–525 | 03 | 03 | L |

TABLE 2

| | 525 Line PAL-M Television Standard | | |
|---|---|---|---|
| | Line-type Numbers | | Unblanking |
| Line Number | Assigned | Possible Modify | Gate Signal |
| 001–003 | 01 | 01 | L |
| 004–006 | 03 | 03 | L |
| 007 | 15 | 15 | H |
| 008 | 07 | 07 | H |
| 009–018 | 08 | 09 | H |
| 019–258 | 09 | 09 | L |
| 259 | 11 | 11 | L |
| 260 | 05 | 05 | L |
| 261,262 | 03 | 03 | L |
| 263 | 00 | 00 | L |
| 264,265 | 01 | 01 | L |
| 266 | 02 | 02 | L |
| 267,268 | 03 | 03 | L |
| 269 | 06 | 06 | H |
| 270 | 07 | 07 | H |
| 271–280 | 08 | 09 | H |
| 281 | 10 | 09 | H |

TABLE 2-continued

525 Line PAL-M Television Standard

| Line Number | Line-type Numbers Assigned | Possible Modify | Unblanking Gate Signal |
|---|---|---|---|
| 282–521 | 09 | 09 | L |
| 522 | 11 | 11 | L |
| 523–525 | 03 | 03 | L |

TABLE 3

625 Line PAL Television Standard

| Line Number | Line-type Numbers Assigned | Possible Modify | Unblanking Gate Signal |
|---|---|---|---|
| 001,002 | 01 | 01 | L |
| 003 | 02 | 02 | L |
| 004,005 | 03 | 03 | L |
| 006 | 07 | 07 | H |
| 007–015 | 08 | 09 | H |
| 016–022 | 08 | 09 | H |
| 023 | 10 | 09 | H |
| 024–309 | 09 | 09 | L |
| 310 | 11 | 11 | L |
| 311,312 | 03 | 03 | L |
| 313 | 00 | 00 | L |
| 314,315 | 01 | 01 | L |
| 316,317 | 03 | 03 | L |
| 318 | 06 | 06 | L |
| 319 | 07 | 07 | H |
| 320–328 | 08 | 09 | H |
| 329–335 | 08 | 09 | H |
| 336–621 | 09 | 09 | L |
| 622 | 11 | 11 | L |
| 623 | 05 | 05 | L |
| 624,625 | 03 | 03 | L |

TABLE 4

525 Line SECAM Television Standard

| Line Number | Line-type Numbers Assigned | Possible Modify | Unblanking Gate Signal |
|---|---|---|---|
| 001,002 | 01 | 01 | L |
| 003 | 02 | 02 | L |
| 004,005 | 03 | 03 | L |
| 006 | 15 | 15 | H |
| 007–015 | 12 | 12 | H |
| 016–022 | 15 | 13 | H |
| 023 | 13 | 13 | L |
| 024–309 | 13 | 13 | L |
| 310 | 13 | 13 | L |
| 311,312 | 03 | 03 | L |
| 313 | 00 | 00 | L |
| 314,315 | 01 | 01 | L |
| 316,317 | 03 | 03 | L |
| 318 | 06 | 06 | L |
| 319 | 15 | 15 | H |
| 320–328 | 12 | 12 | H |
| 329–335 | 15 | 13 | H |
| 336–621 | 13 | 13 | L |
| 622 | 13 | 13 | L |
| 623 | 14 | 14 | L |
| 624,625 | 03 | 03 | L |

Figure 4A:
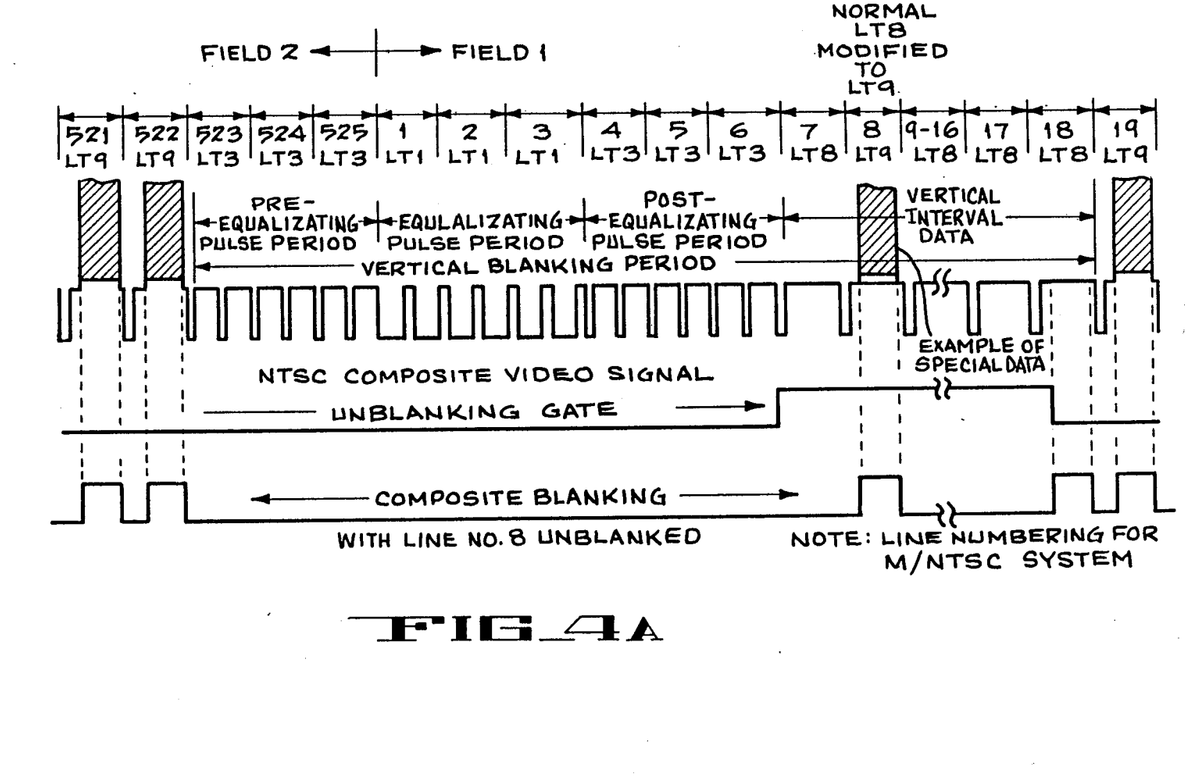
FIGS. 4A and 4B are waveform representation of the vertical interval period for composite video, unblanking gate signal, and composite blanking for the vertical interval in the 525 television standard showing portions of the first and second fields.
Figure 4B:
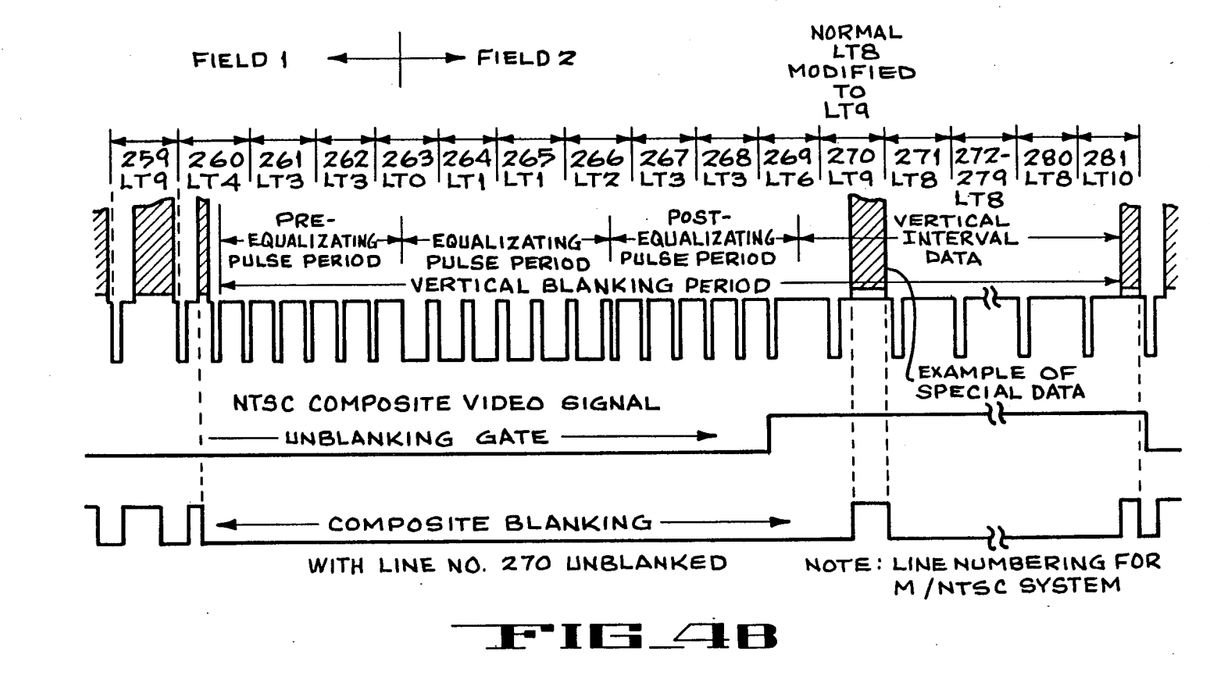

FIGS. 4A and 4B show how line types numbers are assigned to lines of video in the composite video signal. These particular figures are for NTSC, but the principles of assigning line types applies equally to all four television standards.

The line number in FIGS. 4A and 4B begins after the pre-equalizing pulse period. The more accepted standard is to have line numbering begin with the pre-equalizing pulse period for NTSC. This non-standard line number allows compatibility with the other three television standards and is thus used.

The waveforms shown are the composite video signal, unblanking gate signal, and the composite blanking signal. FIG. 4A shows the end of a second field of a previous frame and the beginning of the first field of a new frame of video. Every field begins with the vertical blanking interval. The composite blanking signal normally is low, that is on, during the entire vertical blanking interval. The first field begins with 3 lines of equalizing pulses and 3 lines of post-equalizing pulses. No information is permitted to be encoded on these lines. Lines 1–3 are arbitrarily assigned a line type of 1 (LT1). Lines 4–6, being different from lines 1–3 are assigned a different line type of 3 (LT3).

The remaining lines in the vertical blanking interval can be used to carrying special information, such as VITS. These lines are arbitrarily assigned a line type 8 (LT8). Line 8 shows such a situation where special data has been encoded on a line in the vertical blanking interval. Vertical blanking for this line would normally be on, but this line may be selectively unblanked using the present invention, as shown in FIG. 4A. The lines following the vertical blanking interval, which carry video data, are assigned a line type 9 (LT9).

FIG. 4B shows the end of field one and the beginning of field two. Line 270 also shows such a situation where special data has been encoded on a line in the vertical blacking interval. Vertical blanking for this line would normally be on, but this line may be selectively unblanked using the present invention. The lines following the vertical blanking interval, which carry video data, are assigned a line type 9 (LT9).

Line type for the other television standards are listed in Tables 1 through 4, and can be directly applied to composite video waveforms available in published standards.

Referring again to FIG. 2, the line type generator 38 assigns to each line count 36 a line type according to the above standards. The output is then a series of line types 42.

The series of binary line types 42 are selectively modified by the line type modifier 44. The operation of line type modifier 44 is controlled by unblanking control signal 46. This signal is simply used to control the entire selective unblanking operation. When the unblanking control signal is off, the operation of the line type modifier 44 is disabled and all line types pass through unchanged, thus resulting in normal blanking of the lines during the vertical blanking period. When on, the signal enables the operation of the line type modifier. This signal can be used for remote operation such as part of a video tape recorder control panel.

With the unblanking control signal 46 on, the line type modifier 44 is enabled. When the line type modifier 44 detects the line type assigned to lines which carry video data (LT9 in FIG. 4A; LT9 for NTSC, PAL-M and PAL, and LT13 for SECAM), it passes that line type unchanged. When the line type modifier 44 detects the line types assigned to certain lines in the vertical interval the follow the post-equalizing pulse (LT6 for field two of NTSC, LT15 and LT7 the field one and LT6 and LT7 for field two of PAL-M, LT7 for both fields of PAL, and LT15 and LT12 for both fields of SECAM), those line types are also passed unchanged, but line type modifier 44 sets an unblanking gate signal 48 to unblanking line selector 50.

Upon receiving the line type for lines in the vertical interval following the post equalizing pulses (LT8 in NTSC, PAL-M and PAL, and LT15 in SECAM), line type modifier 44 also sets the unblanking gate signal 48. These are the lines in the vertical interval that may carry special data. Depending upon a modify signal received by line type modifier 44, this last line type is selectively changed to the line type normally assigned to active video (LT8 changed to LT9 in NTSC, PAL-M and PAL, and LT15 changed to LT13 in SECAM). The purpose of unblanking line selector 50 is to provide to line type modifier 44 a modify signal 56 for each line requiring selective unblanking in the two vertical blanking periods.

Additionally, a line type (LT10 in NTSC), representing the half line of video data on field one, line 23 in PAL and on field 2, line 281 in NTSC and PAL-M, produces the unblanking gate signal and may be converted by operator selection to provide line type LT9 at the output of the line type modifier 44. Upon first detection of gate signal 48, unblanking line selector 44 delays either one or two lines as clocked by H pulse signal 54, depending on which television standard was chosen (delay one line for NTSC and PAL, delay two lines for PAL-M and SECAM). This delay is used to synchronize the unblanking line selector 50 with the first of the lines of the vertical blanking period that will be passing through line type modifier 44.

The unblanking selection data 52 contains the information as to which lines are to be selectively unblanked. This data is supplied on an eight bit bus 52 to the unblanking line selector. Only a certain number of lines occur during the vertical blanking period for each television standard. Not including the synchronization lines, none of the current television standards have more than sixteen total lines available to carry special information in each vertical blanking interval. Controller 20 (FIG. 1) sends the unblanking selection data 52 as two bytes of eight bits each. Controller 20 also sends a byte 1 load signal 55 and a byte 2 load signal 57. The first signal indicates that the data on the eight bit bus 52 is the first eight bits of the unblanking selection data. The second signal indicates that the data on the eight bit bus 52 is the second eight bits of the unblanking selection data.

The reference sync generator 16 (FIG. 1) supplies to the controller 20 a frame signal 15 which is used by the controller 20 to determine whether the unblanking selection data for the first or second field should be sent. The unblanking selection data 52 sent by controller 20 is based on switch settings, but could be based on a variety of operator inputs or computer calculations. Because the unblanking selection data 52 is supplied over a simple eight bit data bus, remote operation is possible.

When line type modifier 44 receives a line type 42 from line type generator 38 of the type assigned to lines during the vertical blanking period that follow the post-equalizing pulses and that may carry special information, it modifies those line types (LT8 for NTSC, PAL-M and PAL, LT15 for SECAM) to the line type assigned lines that carry video data (LT9 for NTSC, PAL-M and PAL, LT13 for SECAM) whenever the modify signal is on. When the modify signal is off, the line type is passed unchanged. The modified line types 58 are fed into the output encoder 60.

Output encoder 60 generates a composite blanking signal (including both vertical and horizontal blanking, and selected vertical interval line unblanking) for all line types received except for the line type assigned to lines that carry video data (LT9 for NTSC, PAL-M and PAL-M and PAL, and LT13 for SECAM). While this line type was originally assigned only to lines that carry video data, some other line types may have been modified to this line type.

Figure 3:
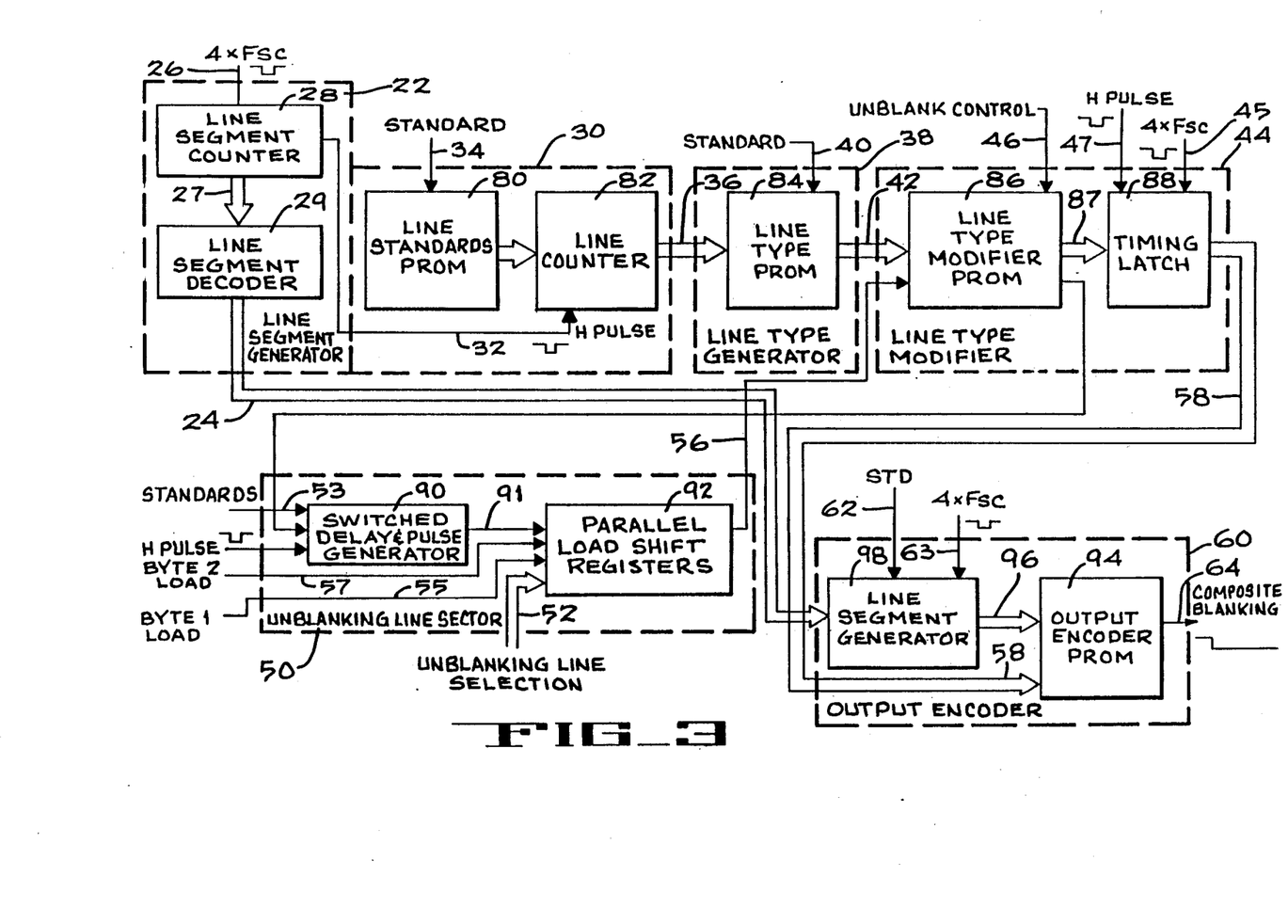
FIG. 3 is a schematic representation in further detail of the selective unblanking circuit of FIG. 2.

Referring now to FIG. 3, the following is a description of the preferred embodiment of the components of the present invention. Line segment generator 22 is composed of line segment counter 28 and line segment decoder 29. Line segment counter 28 can be implemented as a counter which is preloaded with a present count depending on which television standard has been chosen. This counter outputs two signals. The first is the horizontal reference signal (H pulse). The second is a sequential count 27 which is fed to line segment decoder 29. Line segment decoder 29 can be implemented as a line segment PROM and a latch. The line segment decoder simply supplies the reference signal transitions at the appropriate times. This information is readily available as published standards. Line segment data 24 is a four bit number which specifies which of the 16 possible transitions is occurring. Each new transition is issued with its assigned four bit number at the time of the transition.

Line count generator 30 can be implemented as a line standards PROM 80 and line counter 82. Depending on line count standards signal 34, line standards PROM 80 preloads line counter 82 with a number required to give the effective count for that particular television standard. The contents of line standards PROM 80 are easily derived from the lines per frame of video in each television standard and the design of line counter 82. Line counter 82 can be implemented as three 74LS163 TTL integrated circuit devices.

Line type generator 38 can be implemented as a line type PROM 84. Used in this manner, a PROM acts as a translator. The inputs, line count 36 and line type standards signal 40, are used to address a certain location in line type PROM 84, which in turn outputs the required line type. The contents of line type PROM 84 are derived from Tables 1 through 4. A separate address area in the PROM should be aside for each television standard. Based on the specification for each television standard, which is well known to those skilled in the art, each sequential address location in the PROM which will be addressed by a sequential line number should contain a line type according to the above description of FIGS. 4a and 4b. This assigning must be done for each television Line type modifier 44 can be implemented as a line type modifier PROM 86 and timing latch 88. The input address to line type modifier PROM 86 are the line types 42, unblanking control 46, and modify signal 56. The data outputs of line type modifier PROM 86 are modified line types 87 and gate signal 48. The derivation of the contents of line type modifier PROM 86 can easily be accomplished by one skilled in the art using Tables 1 through 4.

The modified line types 87 are fed into timing latch 88 which is enabled by the H pulse and then reclocked at four times subcarrier frequency before being sent to the output encoder. This timing latch 88 is important to provide a precise one horizontal period delay before the line types are sent to the output encoder 60 to ensure correct timing of line type data 58 and line segment data 24. Timing latch 88 can be implemented as a 74LS377 TTL integrated circuit device.

Unblanking line selector 50 can be implemented as a switched gate delay and pulse generator 90 and parallel load shift registers 92. Delay and pulse generator 90 provides a gated clock signal 91 to parallel load shift registers 92 so that their contents are sent as the modify signal at the horizontal rate. Delay 90 waits one line (NTSC) or two lines (PAL, PAL-M and SECAM) before sending the modify clock signal 91. Delay standards signal 53 determines the appropriate delay. The delay can be implemented as one 74LS74 TTL dual flip-flop integrated circuit and the pulse generator can also be implemented as one 74LS74 TTL integrated circuit.

Prior to receiving the first modify clock signal 91, controller 20 (FIG. 1) provides two bytes of unblanking line selection data 52 to parallel load shift registers 92. This data is loaded into the first or second half of parallel load shift registers 92 depending upon the status of byte load signals 55 and 57. Upon receiving gated clock signal 91, parallel load shift registers 92 send the unblanking line selection data 52 serially as modify signal 56 to line type modifier 44. The parallel load shift registers 92 can be implemented as two 74LS165 TTL integrated circuit devices.

The contents of output encoder PROM 94 can be derived from the following. Simply stated, only when output encoder PROM 94 receives the line type for normal active video or lines to be unblanked in the vertical blanking period should it issue the horizontal unblanking signal, which is timed to the blanking transitions of the line segment data 24.

To restate, the effect of the above described apparatus is the generation of a composite blanking signal which may be modified such that certain lines in the vertical blanking period may be selectively unblanked to allow video data on those lines to pass through the picture processing apparatus.

While the embodiments disclosed herein are preferred, it will be appreciated that they are merely examples, and that various alternatives, modifications, variations or improvements thereon may be made by those skilled in the art from this teaching, which are intended to be encompassed by the following claims.

I claim:

1. A method of producing a signal for the selective unblanking of lines of information which are normally blanked within the vertical blanking interval according to a predetermined television format, said method comprising the steps of:
   generating a sequential line counter representing each line of information in a frame of video information;
   assigning a line type to each sequential line count, said line type being of a first type when said line count represents a line of video information that is normally not blanked according to the predetermined television format and being of a second type when said line counter represents a line of information that is normally blanked according to the predetermined television format;
   selectively modifying ones of said second line type to said first line type in response to unblanking selection data so as to selectively unblank lines of information within the vertical blanking intervals as well as at the beginning and ends of the vertical blanking intervals; and
   after the modifications have been made, producing a blanking signal only in response to unmodified ones of said second line type.

2. The method of claim 1 wherein the step of generating a sequential line count further comprises the steps of:
   loading a standard line count into a counter, said standard line count being related to the number of lines in the frame of video information according to the predetermined television format; and
   incrementing said counter to produce said sequential line count.

3. The method of claim 1 wherein the step of assigning a line type comprises the steps of:
   addressing a line type store with said sequential line count; and
   outputting ones of said first and second line type from said line type store.

4. The method of claim 1 wherein the step of modifying ones of said second line type further comprises the steps of:
   detecting ones of said second type;
   generating a gate signal upon said detecting of a line type of said second type;
   generating a modify signal in response to said gate signal in accordance with said unblanking selection data; and
   modifying ones of said second line type to said first line type in response to said modify signal.

5. The method of claim 4 wherein the step of generating a modify signal further comprises the steps of:
   loading a shift register with said unblanking selection data;
   outputting unblanking selection data from the shift register in serial form as said modify signal.

6. The method of claim wherein the step of assigning a line type comprises:
   assigning a line type of a third type when said line count represents a line which immediately precedes ones of the lines which are normally blanked according to the predetermined television format.

7. The method of claim 6 wherein the step of modifying said line types further includes the steps of:
   detecting line types of at least one of said second and third line types;
   generating a gate signal upon said detecting of a line type of at least of one of said second and third types;
   generating a modify signal in response to said gate signal in accordance with said unblanking selection data; and
   modifying said second line type to said first line type in response to said modify signal.

8. The method of claim 7 wherein the step of generating a modify signal comprises the steps of:
   loading a shift register with said unblanking selection data; and
   outputting said unblanking selection data from the shift register in serial form as said modify signal.

9. The method of claim 1 further including the steps of:
   generating line type transition data timed to a blanking signal; and
   detecting ones of said second line type;
   outputting a vertical blanking signal in response to said line type transition data only upon the detection of ones of said second line type.

10. A method of selectively unblanking lines of information which are normally blanked according to a predetermined television format, comprising the steps of:

generating a sequential line count representing each line of information in a frame of video information;

assigning a line type to each sequential line count, said assignment being of a first type when said line count represents a line of video information that is normally not blanked according to the predetermined television format, said assignment being of a second type when said line count represents a line of information that is normally blanked according to the predetermined television format;

selectively modifying ones of said second line type to said first line type in response to unblanking selection data so as to selectively unblank lines of information within vertical blanking intervals as well as at the beginning and ends of the vertical blanking intervals; and blanking only unmodified lines of information of said second line type.

11. The method of claim 10 wherein the step of generating a sequential line count further comprises the steps of:

loading a beginning line count into a counter, said beginning count being related to the number of lines in the frame of video information according to the predetermined television format; and incrementing said counter to produce said sequential line count.

12. The method of claim 10 wherein the step of modifying said line types further comprises the steps of:

detecting line types of said second type;

generating a gate signal upon the detecting of ones of said second line type;

generating a modify signal in response to said gate signal in accordance with said unblanking selection data; and modifying ones of said second line type to said first line type in response to said modify signal.

13. The method of claim 12 wherein the step of generating a modify signal further comprises the steps of:

loading a shift register with said unblanking selection data;

outputting said unblanking selection data from the shift register in serial form as said modify signal.

14. A method of producing a vertical blanking signal for the selective unblanking of lines of information which are normally blanked according to a predetermined television format, said method comprising the steps of:

assigning a line type to each line in a frame of video information, said line type being of a first type when said line represents a line of video information that is normally not blanked according to the predetermined television format and said line type being a second type when said line represents a line of information that is normally blanked according to the television format;

modifying the line type of ones of said second line type to said first line type in response to unblanking selection data so as to selectively unblank lines of information within the vertical blanking intervals as well as at the beginning and ends of the intervals; and producing said vertical blanking signal only in response to unmodified ones of the second line type.

15. The method of claim 14 wherein the step of generating a sequential line count further comprises the steps of:

loading a beginning line count into a counter, said beginning count being related to the number of lines in the frame of video information according to the predetermined television format; and incrementing said counter to produce said sequential line count.

16. The method of claim 14 wherein the step of modifying ones of said second line types includes the steps of:

detecting ones of said second line type;

generating a gate signal upon the detecting of ones of said second line type;

generating a modify signal in response to said gate signal in accordance with said unblanking selection data; and modifying ones of said second line type to said first line type in response to said modify signal.

17. The method of claim 16 wherein the step of generating a modify signal further comprises the steps of:

loading a shift register with said unblanking selection data;

outputting said unblanking selection data from the shift register in serial form as said modify signal.

18. The method of claim 14 wherein the step of producing said vertical blanking signal further comprises:

generating line type transition data timed to a blanking signal; and detecting ones of said second line type;

outputting a vertical blanking signal in response to said line type transition data only upon the detection of unmodified ones of said second line type.

19. An apparatus for producing a vertical blanking signal for the selective unblanking of lines of information, which are normally blanked according to a predetermined television format, comprising:

means for generating a sequential line count representing each line of information in a frame of video information;

means for assigning a line type to each sequential line count, said line type being of a first type when said line count represents a line of video information that is normally not blanked according to the predetermined television format, said line type being of a second type when said line count represents a line of information that is normally blanked according to the predetermined television format;

means for modifying ones of said second line type to said first line type in response to unblanking selection data so as to selectively unblank lines of information within the vertical blanking intervals as well as at the beginning and ends of the vertical blanking intervals; and means for producing a vertical blanking signal only in response to unmodified ones of said second line type.

20. The apparatus of claim 19 wherein the means for generating a sequential line count further comprises:

means for loading a beginning line count into a counter, said beginning count being related to the number of lines in the frame of video information according to the predetermined television format; and means for incrementing said counter to produce said sequential line count.

21. The apparatus of claim 19 wherein the means for modifying said line types further comprises:

means for detecting ones of said second line type;

means for generating a gate signal upon the detecting on ones of said second line type;

means for generating a modify signal in response to said gate signal in accordance with said unblanking selection data; and means for selectively modifying said ones of said second line type to said first line type in response to said modify signal 22. The apparatus of claim 21 wherein the means for generating a modify signal further comprises:

means for loading a shift register with said unblanking selection data;

means for outputting said unblanking selection data in serial form from the shift register as said modify signal.

23. The apparatus of claim 21 wherein the means for producing said vertical blanking signal further comprises:

means for detecting ones of said second line type;

means for generating line type transition data timed to blanking signals; and means for outputting a vertical blanking signal in response to said line upon the detecting of said ones of said second line type.

24. An apparatus for the selective unblanking of lines of information which are normally blanked according to a predetermined television format, comprising:

means for generating a sequential line count representing each line of information in a frame of video information;

means for assigning a line type to each sequential line count, said line type being of a first type when said line count represents a line of video information that is normally not blanked according to the predetermined television format, said line type being of a second type when said line count represents a line of information that is normally blanked according to the predetermined television format;

means for modifying ones of said second line type to said first line type in response to unblanking selection data so as to selectively unblank lines of information within the vertical blanking intervals as well as at the beginning and ends of the vertical blanking intervals; and means for producing blanking signals only in response to unmodified ones of said second line type.

25. An apparatus for producing a blanking signal for the selective unblanking of lines of information, which are normally blanked within the vertical blanking interval according to a predetermined television format, said apparatus comprising:

means for assigning a line type to each sequential line in a frame of video information, said line type being of a first type when said line represents a line of video information that is normally not blanked according to the predetermined television format, said line type being of a second type when said line represents a line of information that is normally blanked according to the predetermined television format;

means for modifying the line type of said second line type to said first line type in response to unblanking selection data so as to selectively unblank lines of information within the vertical blanking intervals as well as at the beginning and ends of the vertical blanking intervals; and means for producing vertical blanking signal only in response to unmodified ones of said second line type.

26. Apparatus for producing a video blanking signal comprising:

a line count generator for generating a sequential line count related to the total number of lines in a frame of video information;

a line type generator for assigning line types to each line count of said sequential line count such that a first line type is assigned to a line count which designates a line that is normally not blanked according to a predetermined television format and a second line type is assigned to a line count which designates a line that is normally blanked according to the predetermined television format;

a line type modifier for selectively modifying said second line type to said first line type for lines within the vertical blanking interval in response to unblanking line selection data; and an output encoder for producing a said video blanking signal only upon receiving said second line type from said line type modifier.

27. The apparatus of claim 26 wherein said line counter generator includes:

a line formats store containing a line count number; and a counter for generating said sequential line count which is related to said line count number contained a said line formats store.

28. The apparatus of claim 26 wherein said line type generator is a read only memory.

29. The apparatus of claim 26 wherein said line type modifier includes:

means for detecting ones of said second line type;

means for generating a gate signal upon the detection of ones of the second type;

an unblanking line selector for generating a modify signal upon receiving said gate signal and unblanking line selection data; and means for modifying ones of said second line type to said first line type in response to said modify signal.

30. The apparatus of claim 29 wherein said unblanking line selector further comprising a parallel load shift register for receiving said unblanking line selection data in a parallel data form and converting it to a serial data form as said modify signal.

31. The apparatus of claim 26 wherein said output encoder further comprising:

a line segment generator for generating a timing signal for said video blanking signal; and an output encoder store for producing said video blanking signal timed to said timing signal upon receiving ones of said second line type from said line type modifier.

32. A reference synchronous signal generator for producing a video vertical blanking signal comprising:

a line count generator for generating a sequential line count related to the total number of lines in a frame of video information;

a line type generator for assigning line types to each line count of said sequential line count such that a first line type is assigned to the line counts which designate lines that are normally not blanked according to a predetermined television format and a second line type is assigned to the line counts which designates lines that are normally blanked within the vertical blanking interval according to the predetermined television format;

a line type modifier for selectively modifying ones of said second line type to said first line type within the vertical blanking interval in response to unblanking line selection data; and an output encoder for producing said video vertical blanking signal only upon receiving said remaining ones of second line type from said line type modifier.

33. A time-base corrector for producing an output video signal in which lines of video information are selectively unblanked, said time-base corrector comprising:
means for generating a processed video signal from an input video signal;
means for providing reference synchronous signals comprising:
(a) a line count generator for generating a sequential line count related to the total number of lines in a frame of video information;
(b) a line type generator for assigning line types to each of said sequential line counts such that a first line type is assigned to designate a line that is not normally blanked according to a predetermined television format and a second line type is assigned to designate a line that is normally blanked according to the predetermined television format;
(c) a line type modifier for modifying ones of said second line type to said first line type within vertical blanking intervals in response to unblanking line selection data;
(d) an output encoder for producing a video vertical blanking signal only upon receiving ones of said second line type from said line type modifier; and
means for combining said processed video signal and said reference synchronous signals to form an output video signal.

34. A method of producing a signal for the selective unblanking of lines of information which are normally blanked in a vertical blanking interval according to a predetermined television format, comprising:
generating a sequential line count representing each line of information in a frame of video information;
assigning a line type to each sequential line count, said line type being of a first type to represent a line of video information that is normally not blanked according to the predetermined television format and being of a second type to represent a line of information that is normally blanked according to the predetermined television format;
detecting ones of the second line type;
generating a gate signal upon detecting ones of said second line type;
generating a modify signal in response to said gate signal in accordance with unblanking selection data;
modifying ones of said second line type to said first line type in response to said modify signal so as to selectively unblank lines of information within the vertical blanking interval which would normally be blanked according to the predetermined television format; and
after the modifications have been made, producing a vertical blanking signal only in response to unmodified ones of said second line type.

35. The method of claim 34 wherein the step of generating a modify signal includes the steps of:
loading a shift register with said unblanking selection data;
outputting said unblanking selection data from said shift register in serial form as said modify signal.

36. The method of claim 34 wherein the step of assigning a line type includes:
assigning a line type of a third type to designate a line which immediately precedes a line which is normally blanked according to the predetermined television signal.

37. The method of claim 34 wherein the step of modifying ones of said second line type further includes:
detecting line types of at least one of said second or third line types;
generating a gate signal upon detecting ones of said second or third line types;
generating a modify signal in response to said gate signal in accordance with said unblanking selection data; and
modifying ones of said second line type to said first line type in response to said modify signal.

38. The method of claim 36 wherein the step of generating a modify signal further comprises the steps of:
loading a shift register with said unblanking selection data; and
outputting said unblanking selection data from the shift register in serial form as said modify signal.

39. A method of selectively unblanking lines of information which are normally blanked according to a predetermined television format, said method comprising the steps of:
generating a sequential line count representing each line of information in a frame of video information;
assigning a line type to each sequential line count, said line type being of a first type when said line count represents a line of video information that is normally not blanked according to the predetermined television format, said line type being of a second type when said line count represents a line of information that is normally blanked according to the predetermined television format;
detecting ones of the second type;
generating a gate signal upon detecting ones of said second line type;
generating a modify signal in response to said gate signal in accordance with said unblanking selection data;
modifying ones of said second line type to said first line type in response to unblanking selection data so as to selectively unblank lines of information which would normally be blanked within a vertical blanking interval according to the predetermined television format; and
blanking only those lines of information which correspond to unmodified ones of said second line type.

40. The method of claim 39 wherein the step of generating a modify signal further comprises the steps of:
loading a shift register with said unblanking selection data;
outputting said unblanking selection data in serial form as said modify signal.

41. A method of producing a vertical blanking signal for the selective unblanking of lines of information which are normally blanked according to a predetermined television format, said method comprising the steps of:
assigning a line type to each line in a frame of video information, said line type being of a first type when said line represents a line of video information that is normally not blanked according to the predetermined television format and said line type being of a second type when said line represents a line of information that is normally blanked according to the predetermined television format;

detecting ones of the second line type;

generating a gate signal upon detecting ones of said second line type;

generating a modify signal in response to said gate signal in accordance with unblanking selection data;

modifying ones of said second line type to said first line type in response to said modify signal so as to selectively unblank lines of information which would normally be blanked within the vertical blanking interval according to the predetermined television format; and producing said vertical blanking signal only in response to remaining line types of said second type.

42. The method of claim 41 wherein the step of generating a modify signal further comprises the steps of:

loading a shift register with said unblanking selection data;

outputting said unblanking selection data in serial form as said modify signal.

43. An apparatus for producing a vertical blanking signal for the selective unblanking of lines of information, which are normally blanked according to a predetermined television format, said apparatus comprises:

means for generating a sequential line count representing each line of information in a frame of video information;

means for assigning a line type to each sequential line count, said line type being of a first type when said line count represents a line of video information that is normally not blanked according to the predetermined television format, said line type being of a second type when said line count represents a line of information that is normally blanked according to the predetermined television format;

means for detecting line type of the second type;

means for generating a gate signal upon detecting a line type of said second type;

means for generating a modify signal in response to said gate signal in accordance with unblanking selection data;

means for modifying said second line type to said first line type in response to modify signals so as to selectively unblank lines of information which would normally be blanked within the vertical blanking interval according to the predetermined television format; and means for producing vertical blanking signal only in response to remaining line types of said second line type.

44. Apparatus of claim 43 wherein the means for generating a modify signal further comprises:

means for loading a shift register with said unblanking selection data;

means for outputting said unblanking selection data in serial form as said modify signal.

45. Apparatus for producing a video vertical blanking signal comprising:

a line count generator for generating a sequential line count related to the total number of lines in a frame of video information;

a line type generator for assigning line types to each line count such that a first line type designates a line that is normally not blanked according to a predetermined television format and a second line type designates a line that is normally blanked according to the predetermined television format;

means for detecting ones of the second line type;

means for generating a gate signal upon the detection of ones of the second line type;

an unblanking line selector for generating a modify signal upon receiving a gate signal and unblanking line selection data;

modifying means for modifying ones of said second line type to said first line type in response to the modify signals generated in response to unblanking line selection data; and an output encoder for producing a video vertical blanking signal only upon receiving ones of said second line type from the modifying means.

* * * * *